United States Patent
Pison et al.

(10) Patent No.: US 11,381,968 B2
(45) Date of Patent: Jul. 5, 2022

(54) SYSTEM AND METHOD FOR MANAGING AUTHENTICATION FOR THE DIRECT COMMUNICATION BETWEEN MOBILE COMMUNICATION TERMINALS OF A MOBILE RADIO COMMUNICATION SYSTEM

(71) Applicant: AIR-LYNX, Les Ulis (FR)

(72) Inventors: Laurent Pison, Jouars Pontchartrain (FR); François Dubois, Cauvigny (FR)

(73) Assignee: BULL SAS, Les Clayes-sous-Bois (FR)

(*) Notice: Subject to any disclaimer, the term of this patent is extended or adjusted under 35 U.S.C. 154(b) by 0 days.

(21) Appl. No.: 17/136,512

(22) Filed: Dec. 29, 2020

(65) Prior Publication Data
US 2021/0204124 A1 Jul. 1, 2021

(30) Foreign Application Priority Data
Dec. 31, 2019 (FR) .................................. 1915749

(51) Int. Cl.
*H04W 12/06* (2021.01)
*H04W 12/106* (2021.01)
*H04W 12/04* (2021.01)
*H04W 76/14* (2018.01)

(52) U.S. Cl.
CPC ........... *H04W 12/06* (2013.01); *H04W 12/04* (2013.01); *H04W 12/106* (2021.01); *H04W 76/14* (2018.02)

(58) Field of Classification Search
CPC .............................. H04W 12/06; H04W 12/069
USPC .................................. 455/411; 713/171, 151
See application file for complete search history.

(56) References Cited

U.S. PATENT DOCUMENTS

| 2011/0045799 | A1* | 2/2011 | Cofta | H04W 12/0431 |
| | | | | 455/411 |
| 2019/0386972 | A1* | 12/2019 | Boutnaru | H04L 9/085 |
| 2021/0409214 | A1* | 12/2021 | Nix | H04L 9/085 |

FOREIGN PATENT DOCUMENTS

| EP | 3096544 B1 | 11/2016 |
| EP | 3675542 A1 | 7/2020 |

OTHER PUBLICATIONS

Preliminary Search Report in corresponding French application FR 1915749 dated Sep. 4, 2020, 3 pages.

* cited by examiner

*Primary Examiner* — Kiet M Doan
(74) *Attorney, Agent, or Firm* — ARC IP Law, PC; Joseph J. Mayo

(57) ABSTRACT

The invention relates to a communication system (1) comprising a local mobile communication terminal (10) and a remote mobile communication terminal (20), configured to establish a direct mode link after prior authentication of the remote mobile communication terminal, the local mobile communication terminal (10) further comprising:
a subscription database (11) adapted to include security information;
a security management entity emulator (12) adapted to emulate an access interface to a subscription database (11), and,
a proxy module (13) configured to relay an authentication request to the security management entity emulator (12) for the authentication of said remote mobile communication terminal (20) to the subscription database (11) of said local mobile communication terminal (10).

13 Claims, 9 Drawing Sheets

SYSTEM AND METHOD FOR MANAGING AUTHENTICATION FOR THE DIRECT COMMUNICATION BETWEEN MOBILE COMMUNICATION TERMINALS OF A MOBILE RADIO COMMUNICATION SYSTEM

The present invention relates generally to radio communication systems with mobiles. In particular, it relates to a system supporting authenticated direct communication between mobile communication terminals.

PRIOR ART

Mobile telecommunications networks, such as cellular networks defined by the 3GPP consortium, such as networks based on GSM, UMTS, LTE ("Long Term Evolution"), and its evolution LTE-A ("Advanced LTE"), standards, enable high-speed communications between mobile terminals. The architecture of these networks is generally based on a set of base stations, called eNodeBs (from the English "evolved Node B") in the LTE standard, which are fixed network nodes forming the radio portion of the network, called the eUTRAN in the LTE standard, and which establish wireless communications with mobile terminals, called UEs (from the English "User Equipment") in the LTE standard, via a specific radio interface, called the Uu interface in the LTE standard.

Authentication of mobile communication terminals in telecommunication networks generally uses secrets shared between an HSS (for "Home Subscriber Server", in English) server in the core network, and a USIM (for "Universal Subscriber Identity Module", in English) card, of mobile communication terminals, using the EMM (from the English "EPS Mobility Management") protocol between an MME (for "Mobility Management Entity", in English) entity and a mobile communication terminal (UE) via an eNodeB and the LTE-Uu radio interface between said eNodeB and said UE.

Authentication of mobile communication terminals within the network must necessarily go through the core of the network, called the EPC (from the English "Evolved Packet Core") in the LTE standard. In other words, mobile communication terminals in telecommunication networks cannot authenticate each other directly, but only via the network core.

In some cases, however, it may be desirable to be able to establish a communication link between two authenticated individual pieces of equipment without any communication infrastructure from which such equipment access the telecommunications network.

A typical use case is, for example, that of security forces, especially in the context of external operations, and rescue forces (police, fire brigade, ambulances, etc.) who need to be able to collaborate and communicate with each other following, for example, an interruption of conventional communication services due to a system overload or a natural disaster, such as an earthquake or a tidal wave, with the immediate consequence that the shore-based communication participating in the network core are shut down. There is therefore a need for a solution for setting up a substitution network between the mobile terminals and/or mobile cells, to compensate for the failure of the standard network and/or the equipment of the network core.

In summary, especially, but not only, in the context mentioned above, it may be useful for specific applications to establish communication links between several mobile communication terminals, in order to make the data exchanges between these mobile structures autonomous with respect to the network core. Nevertheless, in this context, there is the issue of the protocol for establishing a direct or indirect link between mobile communication terminals and in particular the level of security associated therewith. Indeed, in general, on conventional NB systems (for example Tetra or P25), there is no authentication or even encryption possible at the level of radio D2D exchange nor integrity management. The only possibility is to secure communications at the level of the application flow, for example by means of group communication keys.

For example, a two-way professional digital mobile radio system has been proposed, comprising a plurality of mobile communication terminals. Such mobile communication terminals can communicate in a direct mode, where each mobile communication terminal exchanges with another terminal without going through a base station, or use the infrastructure of a communication network through a base station. This allows direct communications in situations where the network's radio coverage has been lost. This functionality allows, for example, direct communications in basements or areas with poor radio coverage. Such a digital radio system can carry several types of data communication. Packet-mode data or circuit-switched data communication use channels dedicated to this traffic. The security relating to the traffic of this data is ensured by encrypting said data when it is sent or by end-to-end encryption.

In addition, this communication system generally operates on a band frequency below one Giga Hertz (GHz). Indeed, digital radio systems operate in a frequency spectrum generally between 160 MHz and 400 MHz, in particular as defined in standards EN 300 392-1 and EN 300 392-2. As a result, the data transfer is slow (of the order of 7.2 kbit/s per time-slot), the usable data rate is only 3.5 kbit/s. This rate can be increased moderately by using up to four combined time slots, for example by using mainly four interleaved channels in a 25 Kilo Hertz (KHz) carrier using a time division multiple access "TDMA" (for "time division multiple access" in Anglo-Saxon terminology). Thus, such a digital radio system can only support a much smaller number of mobile communication terminals than a conventional network, such as GSM (for "Global System for mobile" in Anglo-Saxon terminology), UMTS (for "Universal Mobile Telecommunications System" in Anglo-Saxon terminology), LTE (for "Long term Evolution" in Anglo-Saxon terminology) or advanced LTE networks allow in a given geographical area and similar technologies allow in a given sector.

A solution could be based on establishing a link of the direct-mode link type so as to create a link between a mobile communication terminal and one or more other mobile communication terminals. However, this type of link no longer allows the use of the network infrastructure usually used to manage the security aspects according to known techniques of the LTE standards of the 3GPP consortium, for example.

Indeed, when establishing a dUE-dUE connection (in a mode called a "D2D mode", for "device to device" in Anglo-Saxon terminology, in the present description), the eNodeb and the Uu interface are not used. The framework provided in the LTE standards for security management using the USIM module and the HSS server (shared secret exchange) therefore cannot be used as it stands for authentication, encryption and integrity control.

There is therefore a need for a method or system for managing the authentication of one or more mobile communication terminals for the establishment of direct-mode, secure and high-speed communications, while eliminating the need for the infrastructure of a fixed communication network.

Technical Problem

The invention aims to overcome the disadvantages of the prior art. In particular, the invention aims to provide an alternative for dispensing with the fixed network infrastructure for the management of authentication aspects, in particular the authentication of a mobile communication terminal participating in the establishment of a direct mode link with another mobile communication terminal, while using standardized authentication techniques and making it possible to support the most recent and advanced security techniques.

BRIEF DESCRIPTION OF THE INVENTION

To this end, a first aspect of the invention relates to a communication system comprising a local mobile communication terminal and a remote mobile communication terminal, said remote mobile communication terminal including an electronic safe configured to store at least one security key, said local mobile communication terminal being configured to establish a direct mode link with said remote mobile communication terminal, said communication system being characterized in that said local mobile communication terminal includes:
- a subscription database configured to store at least one security key, each of the security keys forming a secret shared between a local mobile communication terminal and one or more remote mobile communication terminals and to generate at least one authentication vector from the at least one security key;
- a security management entity emulator, configured to emulate an access interface to the subscription database of said local mobile communication terminal and to generate an authentication request from the at least one authentication vector; and,
- a proxy module configured to relay the authentication request, between the security management entity emulator and the remote mobile communication terminal, said authentication request including a signaling portion of a protocol conforming to the direct mode link, for the authentication of said remote mobile communication terminal to the subscription database of said local mobile communication terminal.

The invention is based in particular on the use of a local subscription database (that is of a local mobile communication terminal), as well as the unique identifier of the remote mobile communication terminal wishing to establish a communication in a direct mode with the local mobile communication terminal, in order to manage the security of each mobile communication terminal and to prevent unauthorized mobile communication terminals from connecting and disrupting or intercepting communications between mobile communication terminals. The present invention allows, in particular, the right of a given mobile communication terminal to connect to a remote mobile communication terminal to be managed. An advantage of the invention, in particular, is that it allows the use of mobile communication terminals using known authentication techniques for the establishment of direct communication. The new transport path implemented by a system according to the invention advantageously allows the use of an identification module such as a USIM module and conventional access protocols to authenticate a remote mobile communication terminal. Thus, the logical protocol used remains as close as possible to existing protocols to ensure ease of use and support as close as possible to standard protocols and their evolution. There is therefore a possible support of the most recent and advanced security techniques.

A further advantage of the fact that authentication aspects are supported by the direct link between mobile communication terminals is that it is possible to use (in addition to unicast) a point-to-multipoint protocol that allows multiple signaling acquisitions to be performed.

Finally, a communication system according to the invention has the advantage of making it possible to dispense with the use of an advanced base station or an MME (from the English "Mobility Management Entity" for mobility management entity) type entity and an HSS (from the English "Home Subscriber Server") associated with a telecommunication infrastructure. Therefore, the communication system according to the invention advantageously allows a connection to be made between two mobile communication terminals, preferably in a direct mode, based on mutual authentication at the outset, in order to prevent unwanted or unauthorized terminals from connecting.

According to other advantageous features of the system, the latter may optionally include one or more of the following features, alone or in combination:
- the authentication request comprises random data as well as a signaling portion of a protocol conforming to the direct mode link.
- The proxy module is further configured to receive an authentication response from the remote mobile communication terminal, said authentication response including a signaling portion of a protocol conforming to the direct mode link and an authentication result.
- The security management entity emulator is further configured to check the correspondence between the authentication result transmitted by the remote mobile communication terminal and an authentication token generated by the subscription database. This allows the correspondence between the security keys stored on the electronic safe of the remote mobile communication terminal and the subscription database of the local mobile communication terminal, respectively, to be checked indirectly.
- the local mobile communication terminal and/or the remote mobile communication terminal include an electronic safe adapted to store a unique identifier associated with said local mobile communication terminal and the remote mobile communication terminal, respectively;
- the proxy module is configured to carry an integrity check message when establishing the communication between the local mobile communication terminal and the remote mobile communication terminal;
- the local mobile communication terminal is configured to establish a direct mode link with a plurality of remote mobile communication terminals according to a point-to-point or multipoint protocol. Indeed, although the direct mode link is the main subject of the present invention, the link can be other, the purpose being to access a remote 'authenticator' terminal;
- the local mobile communication terminal is configured to allow a plurality of remote mobile communication terminals to authenticate with the local mobile communication terminal having the subscription database and then communicate with each other.

the mobile communication terminals are configured so as to be able to use a mobile communication network selected from an LTE, 5G, Wimax, 3G, Wifi or Bluetooth network; These technologies are preferred; Nevertheless, the present invention can be used with any other 'physical' technology allowing the implementation of a point-to-point or multipoint protocol and requiring at least one authentication.

the security management entity emulator is adapted to support an access interface to the subscription database based on a S6a-like interface of the LTE standards of the 3GPP consortium;

the proxy module is adapted to support an access interface to the security management entity emulator based on an EMM protocol of the LTE standards of the 3GPP consortium;

the security management entity emulator of a local mobile communication terminal is adapted to allow the remote mobile communication terminal to perform the authentication request without passing through the radio interface of a base station. Thus, the system can operate even in the event of a malfunction of the accessible base stations;

the local mobile communication terminal is configured to use a specific radio channel for the authentication of remote mobile communication terminals. The use of a radio channel dedicated to authentication makes it possible not to use the radio resources of remote mobile communication terminals which are already communicating on a radio channel dedicated to communication.

According to another aspect, the invention relates to an authentication method between a local mobile communication terminal and a remote mobile communication terminal of a communication system according to the invention, for the establishment of a direct mode link between said mobile communication terminals, said method including the steps of:

transmitting to the local mobile communication terminal an authentication request to the subscription database of said mobile communication terminal from the remote mobile communication terminal;

transmitting, via a proxy module of the mobile communication terminal, the received authentication request to the security management entity emulator of said local mobile communication terminal; and, presenting, to the subscription database of the mobile communication terminal, by the security management entity emulator, the authentication request from the remote mobile communication terminal, for the authentication of said mobile communication terminal to the subscription database of the local mobile communication terminal.

The invention relates to a method for authenticating a remote mobile communication terminal to a local mobile communication terminal, said method including:

sending an attachment message, by the remote mobile communication terminal, said attachment message preferably including the unique identifier of said remote mobile communication terminal;

sending, by the local mobile communication terminal, an authentication request generated from an authentication vector, said authentication vector being generated by a subscription database of said local mobile communication terminal, said authentication request including a signaling portion of a protocol conforming to the direct mode link;

sending an authentication response, by the remote mobile communication terminal, said authentication response including a signaling portion of a protocol conforming to the direct mode link for the authentication of said remote mobile communication terminal to the subscription database of said local mobile communication terminal.

In addition, as will be detailed, this method may include authentication, by the mobile communication terminal, of the local mobile communication terminal; thus constituting mutual authentication of the mobile communication terminals.

According to another aspect, the invention relates to a mobile communication terminal comprising:

a subscription database configured to store at least one security key, each of the security keys forming a secret shared between a local mobile communication terminal and one or more remote mobile communication terminals and to generate at least one authentication vector from the at least one security key;

a security management entity emulator, configured to emulate an access interface to the subscription database of said local mobile communication terminal and to generate an authentication request from the at least one authentication vector; and, a proxy module configured to relay the authentication request, between the security management entity emulator and the remote mobile communication terminal, said authentication request including a signaling portion of a protocol conforming to the direct mode link, for the authentication of said remote mobile communication terminal to the subscription database of said local mobile communication terminal.

Other advantages and features of the invention will appear upon reading the following description given by way of an illustrative and non-limiting example, with reference to the figures in the appended drawings in which.

DESCRIPTION OF THE INVENTION

Figure 1:
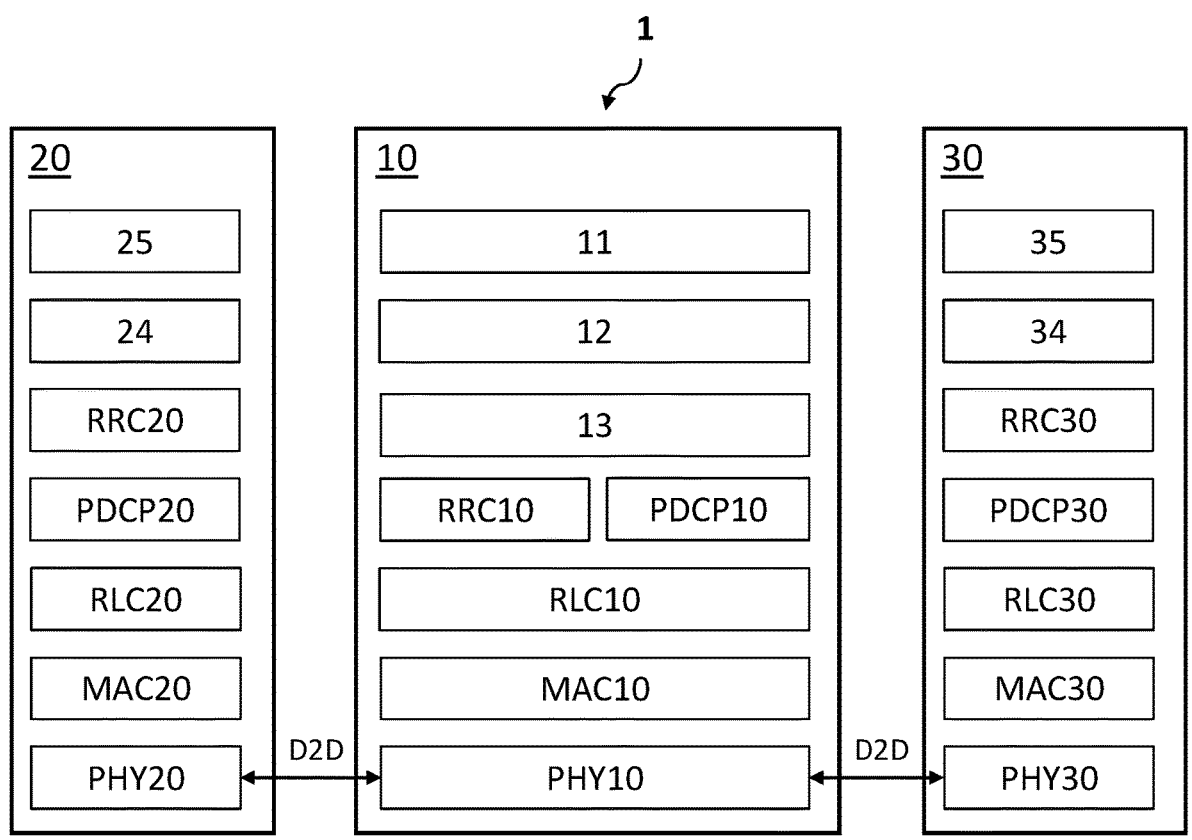
FIG. 1 is a diagram illustrating an embodiment of a communication system for which a single mobile communication terminal comprises a subscription database.

The term "direct" or the expression "direct mode", generally used in reference to modes of communication between two entities, means that no intermediate entity is involved in these communications for carrying data between the transmitting entity and the receiving entity. Direct mode communication can be supported by a wired or radio link. When used in particular with reference to a mode of communication between mobile structures such as defined above, the term "direct" means that carrying data between two mobile structures is done without the intervention of the network core through which these mobile structures could establish their communications.

By "mobile communication terminal" is meant a computer device for processing and exchanging data and comprising an identification module characterized by a unique identifier, such as, by way of a non-limiting example, a USIM (from the English "Universal Identification Module") card, within the meaning of the LTE standards, or an e-sim card associated with the mobile communication terminal. Such a USIM card allows in particular the identification of the mobile communication terminal and, for this purpose, it is particularly suitable for storing a unique identifier of the IMSI (from the English "International Mobile Subscriber Identity") type. This identifier is uniquely associated with the mobile communication terminal. The USIM card can also be adapted to store, in addition, at least one security key noted K #10 or K #20, which is also associated with the mobile communication terminal. More precisely, each mobile communication terminal is associated with an IMSI authenticated by a security key K. In addition, a security key K can be derived to generate a plurality of derived security keys K' or $KSI_{ASME}$ that provide encryption and integrity control of the data exchanged with the mobile communication terminal. In particular, a key can be derived from a primary key.

In the claims, the term "comprise" or "include" does not exclude other elements or other steps. The various features presented and/or claimed may be advantageously combined. Their presence in the description or in different dependent claims, do not exclude this possibility. Finally, the reference signs in the drawings shown in brackets should not be understood as limiting the scope of the invention.

With reference to the diagrams in FIGS. 1 and 2, 3 and 4, different embodiments of a communication system according to the invention will be described and, first of all, the arrangement of the mobile communication terminals composing it.

Thus, FIGS. 1 and 2, 3 and 4 illustrate the stacking of protocol layers supported by communication terminals 10, 20 and/or 30, according to the layered representation of the Open System Interface (OSI) model of the ISO ("International Standard Organization").

The PHY (for "PHYsic" layer) layer PHY10, PHY20 and PHY30 controls the physical communication channel between the mobile communication terminals 10, 20 and 30. In this case, the direct mode link between two mobile communication terminals 10 and 20 or 20 and 30 described in relation to FIGS. 1, 2, 3 and 4 uses a radio channel. It involves, for example, the use of systems for modulating/demodulating, coding, interleaving data, etc.

The MAC (from the English "Medium Access Control") layer MAC10, MAC20, MAC30 manages the access to the communication channel, and multiplexing on a same communication channel and/or scheduling between different "services". This layer controls the underlying layer, that is the PHY layer.

The radio channel can support in the context of the present invention a wide variety of communication protocols such as: Wimax, 802.15.x, direct Wifi, bluetooth, 3G, 4G, 5G, Sidelink and/or Bluetooth. A mobile communication terminal according to the invention can thus, as a minimum, establish communication in a direct mode with a remote communication terminal by implementing any type of communication protocol supported by the PHY and MAC layers of the OSI model.

In a particular embodiment, a mobile communication terminal according to the invention may comprise other protocol layers, in particular in the context of the use of a communication protocol linked to an LTE network and defined by the relative 3GPP standards. The lower protocol layers (that is below the application layer) are common in mobile communication networks such as LTE networks according to the 3GPP standard, and therefore do not need to be described per se here. Only their respective generic functions will therefore be mentioned. The lower protocol layers described hereafter are used to illustrate some embodiments of the present invention and the person skilled in the art will appreciate that in the context of a communication protocol of the Wimax, 802.15.x, direct Wifi, bluetooth type, the lower protocol layers may be different.

Thus, a mobile communication terminal may comprise, at the level above the MAC layer, the RLC (from the English "Radio link Control") layer, shown as RLC10, RLC20, RLC30 in FIGS. 1, 2, 3 and 4, which performs the partitioning of data into "blocks" and the encryption of that data to ensure security.

At the same level, the PDCP (from the English "Packet Data Convergence Protocol") layer, shown as PDCP10, PDCP20, PDCP30 in FIGS. 1, 2, 3 and 4, manages the support of different network protocols used for transmissions, in particular via the data packet headers. The PDCP layer as well as the RRC layer described below are likely, following authentication, to use and manage part of the integrity and encryption linked to the shared secret (Ki). In particular, the PDCP layer can insert a frame number (COUNT_I, COUNT_N . . . ) in the packet header, which allows a different word to be generated for each frame transmitted during a calculation implemented at the application level (for example integrity algorithm). This blocks any possibility of rejection. Thus, advantageously, a mobile communication terminal according to the invention is configured to implement frame numbering associated with an integrity management procedure. Similarly, a method according to the invention may include a frame numbering step associated with an integrity management procedure.

Finally, the RRC (from the English "Radio Resource Control") layer, shown as RRC10, RRC20, RRC30 in FIGS.

1, 2, 3 and 4, manages the use of radio resources by a communication terminal and controls the other layers. In particular, it manages the signaling and configuration of the controls of the PHY, MAC, and RLC layers.

At the application layer above the conventional protocol layers described above (lower layers), is the application code or software implementing various functions necessary for the implementation of the present invention.

In particular, the code or application software above the conventional protocol layers can implement:
- a subscription database 11, 21, 31 of the mobile communication terminal 10, 20 or 30, respectively;
- a safety management entity emulator 12, 22 or 32 of the mobile communication terminal 10, 20 or 30, respectively;
- a proxy module 13, 23 or 33 of the mobile communication terminal 10, 20, or 30, respectively;
- a local access module 14, 24, 34 of the mobile communication terminal 10, 20, or 30, respectively; and
- an electronic safe 15, 25, 35 of the mobile communication terminal 10, 20, or 30, respectively.

Some embodiments of these elements will be described below.

The subscription database 11, 21, 31 is advantageously configured as a centralized database. As will be described later, in a communication system according to the invention, a single mobile communication terminal or only part of the mobile communication terminals may include this subscription database. In particular, when it is local to each terminal, it contains a database supporting only the secrets of the mobile communication terminals that are authorized to connect to that terminal in a direct mode. In particular, the subscription database 11 can be implemented in the form of any code, hardware elements or combination of hardware elements and code that allows the construction of a database. In particular, the subscription database 11, 21, 31 may correspond to an HSS (from the English "Home Subscriber Server") as defined in the 3GPP standard for LTE networks or, for example, an authentication system of the VLR (from the English "Visitor Location Register") type or of the HLR (from the English "Home Location Register") type.

Each of the subscription databases 11, 21, 31 is adapted to identify mobile communication terminals and to manage security information for the authentication of mobile communication terminals with which a mobile communication terminal could establish a communication link.

In particular, the subscription database 11 or 21 of each local or remote mobile communication terminal 10 or 20, respectively, stores the unique identifiers ID10, ID20 as well as the associated security keys K #10, K #20. The security keys K #10 and K #20 associated with the mobile communication terminals 10 and 20, respectively, can also be stored in the subscription databases 11 and 21, respectively, in addition to the unique identifiers ID10 and ID20 of said mobile communication terminals 10, 20, respectively. This is in particular to support, in addition to authentication, encryption and integrity protection of the data to be exchanged by said mobile communication terminals with each other.

The operation of the subscription database will be described in more detail below.

The safety management entity emulator 12, 22, 32 of a mobile communication terminal 10, 20, 30 is advantageously configured to allow, by means of a subscription database 11, local authentication of the local mobile communication terminal 10. It is also advantageously configured to allow remote authentication of remote mobile communication terminals 20, 30 using the subscription database 11 of the local mobile communication terminal 10. In this case, the proxy module 13 is used as a relay for the communication interfaces. In particular, the security management entity emulator 12 may be implemented in the form of any code, hardware elements or combination of hardware elements and code allowing a mobile communication terminal to emulate a security management entity such as that typically found in an EPC.

As for the subscription database 11, 21, 31, in a communication system according to the invention, a single mobile communication terminal or only part of the mobile communication terminals may include this security management entity emulator 12, 22, 32. Typically, mobile terminals including a subscription database 11, 21, 31 will include a security management entity emulator 12, 22, 32.

Preferably, the safety management entity that is emulated will depend on the communication protocols implemented by the communication system. For example, the security management entity emulated may be an entity of the MME (from the English "Mobility Management Entity") type in reference to the LTE standards or of the S4-SGSN or AMF ("Authentication and Mobility Function" in Anglo-Saxon terminology) type. The MME entity is the LTE network equipment managing the signaling (control plane, or "C-plane" in English) between the mobile communication terminals (UE) and the LTE network core. In general, the security management entity emulator 12, 22, 32 is configured so as to emulate a standardized interface Sx between said emulator 12, 22, 32 and the subscription database 11, 21, 31 of a mobile communication terminal whether it is local 10 or remote 20, 30.

More preferably, the safety management entity emulator 12, 22, 32 is configured to support an interface of the relai_Sx type, such as a relai_S6a' interface, carried by a direct mode communication protocol such as a D2D (partly signaling) communication protocol. This allows remote mobile communication terminals to perform an authentication request to the local subscription database 11, 21, 31.

In particular, the security management entity emulator 12, 22, 32 is further configured to provide security management of the communications security of the mobile communication terminal 10, 20, 30. These security management entity emulators are adapted to dialogue with the subscription database 11, 21, 31, respectively, of the corresponding mobile communication terminal 10, 20, 30, respectively, in order to obtain and store security information associated with the mobile communication terminals prior to establishing a communication in a direct mode. These security management entity emulators 12, 22, 32 can in particular generate and manage authentication requests (Authentication-Information-Request in Anglo-Saxon terminology) and their response, via an integrity check message, in order to obtain authentication vectors from the subscription database. The authentication vector(s) is(are) used to perform a time-limited unitary authentication. Preferably, the next authentication will use another vector, but the same key to play the algorithm (either the primary or the derived key, the result being in principle the same).

In addition, the security management entity emulator 12, 22, 32 of a mobile communication terminal 10, 20, 30 may also be adapted to support, in addition to authentication, encryption and integrity protection of data to be exchanged by the mobile communication terminals 10, 20, 30 with each other. The procedure followed is then the same as that described herein for the mutual authentication of mobile communication terminals 10, 20, 30. In addition, data integrity and encryption can be the integrity and encryption for signaling and payload data. For example, the integrity and encryption in the C-plane plane and the encryption in the U-plane plane, respectively, of the LTE standards of the 3GPP consortium.

In a non-limiting example, such an access interface can be a S6a-like interface as defined in the LTE standards of the 3GPP consortium. A S6a-like interface, although not exactly identical to an S6a interface, may be compatible with modules, members and protocols configured to interact with an S6a interface. Its operation will be described in more detail in the following description.

The function of the proxy module 13, 23, 33 of a local mobile communication terminal 10 or a remote mobile communication terminal 20, 30 is in particular to relay an authentication request from a remote mobile communication terminal 20 to a subscription database 11 of the local communication terminal 10, via the security management entity emulator 12 of said mobile communication terminal. In other words, the proxy module 13 of a mobile communication terminal 10, 20, 30 allows remote access in order to authorize remote mobile communication terminals to authenticate to the subscription database 11 via the security management entity emulator 12. In particular, the proxy module 13 can be used to relay D2D interfaces with remote mobile communication terminals. In particular, the proxy module 13 may be implemented in the form of any code, hardware elements or combination of hardware elements and code allowing a mobile communication terminal to relay requests, via a communication network, between a security management entity emulator of a mobile communication terminal and other remote mobile communication terminals.

The proxy module 13, 23, 33, also shortly referred to as a proxy or proxy module in the following, is preferably adapted to carry to the emulator 12, 22, 32 of the corresponding mobile communication terminal 10, 20, 30, respectively, authentication requests from a remote mobile communication terminal. More preferably, the proxy module 13 of a mobile communication terminal 10 is adapted to carry an authentication message from another mobile communication terminal 20, 30 to the security management entity emulator 12 of the mobile communication terminal 10, for authentication of said other mobile communication terminal 20, 30 to the subscription database 11 of the mobile communication terminal 10.

In one particular embodiment of the system, the access interface to the security management entity emulator 12, 22 of each mobile communication terminal 10, 20 which is supported by the proxy module 13, 23 may be a proprietary interface which is based on the EMM protocol of the LTE standards of the 3GPP consortium. Such a proprietary interface is noted as EMM' in the following.

The operation of the proxy module 13, 23, 33 will be described in more detail in the following description.

In addition, each mobile communication terminal may also comprise a local access module 14, 24, 34 which is adapted to allow access to its electronic safe 15, 25 or 35, respectively. Indeed, the one skilled in the art will appreciate that the mobile communication terminals 10 and 20 can be configured as standard mobile terminals, and therefore have an electronic safe 15, 25, respectively, such as, by way of a non-limiting example, a USIM (from the English "Universal Identification Module") card within the meaning of the LTE standards.

The electronic safe 15, 25, 35 of a local mobile communication terminal 10 or a remote mobile communication terminal 20, 30 can correspond, by way of a non-limiting example, to a USIM (from the English "Universal Identification Module") card within the meaning of the LTE standards. Such a USIM card can be used to identify the mobile communication terminal and, for this purpose, it is particularly suitable for storing a unique identifier, noted ID10, ID20 in the following and in the figures, advantageously but not restrictively of the IMSI (from the English "International Mobile Subscriber") or IMEI (from the English "International Mobile Equipment Identity") type. This identifier is uniquely associated with the corresponding communication terminal. More precisely, each mobile communication terminal is advantageously associated with a unique identifier, such as an IMSI, authenticated by a security key. The USIM card, or more generally the electronic safe, can also be adapted to store, in addition, at least one security key noted K #10, K #20, which is also associated with the corresponding mobile communication terminal. Security keys derived from this security key K #20 can be used to encrypt the transmitted data, and to guarantee its integrity. The security keys K #10 and K #20 associated with the mobile communication terminals 10 and 20, respectively, can be stored by the subscription databases 11 and 21, respectively. This is in particular to support, in addition to authentication, encryption and integrity protection of the data to be exchanged by said mobile communication terminals with each other.

Thus, preferably, the electronic safe 15, 25, 35 is defined by the 3GPP TS 21.111 specifications. It takes the form, for example, of a smart card. It stores information for authenticating the subscriber (a "subscriber" corresponding to a mobile communication terminal) when connecting the mobile communication terminal to the network such as a security key K #10, K #20 and a unique identifier ID10, ID20.

Figure 2:
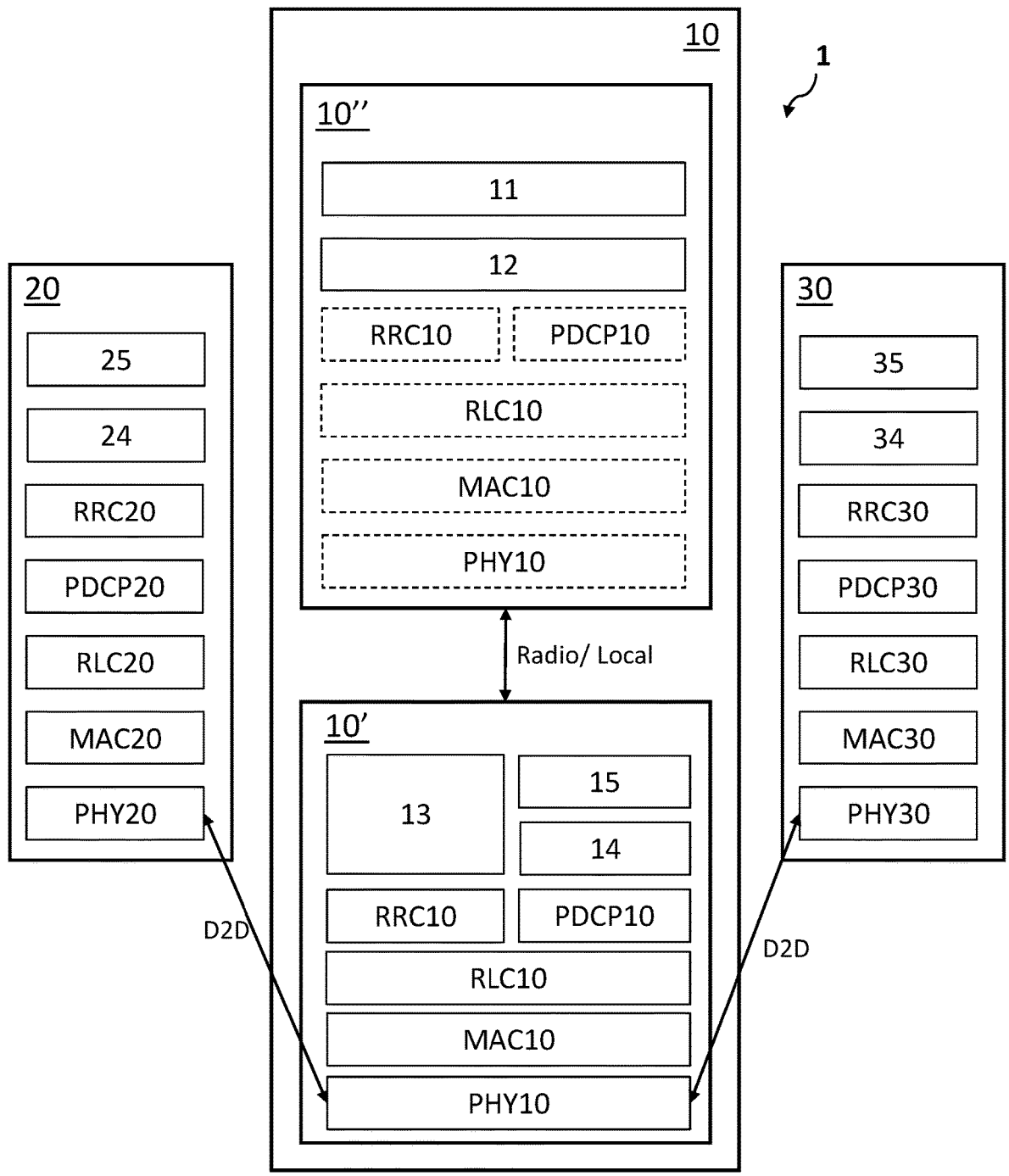
FIG. 2 is a diagram illustrating an embodiment of a communication system for which a single mobile communication terminal comprises a subscription database and this local mobile communication terminal is divided into two functional sets.

FIGS. 1 and 2 illustrate two embodiments of a communication system according to the invention in which the local mobile communication terminal 10 is the only terminal to include a subscription database 11, a security management entity emulator 12, and a proxy module 13, 23, 33. In this case, the remote mobile communication terminals 20, 30 will be able to authenticate to the local mobile communication terminal 10. As illustrated, communications between the remote mobile communication terminals 20, 30 and the local mobile communication terminal 10 can be "device to device" (Anglo-Saxon terminology that can correspond to device-to-device) communications.

As illustrated in FIG. 2, the local mobile communication terminal 10 can be divided into two functional sets 10', 10". A first functional set 10' may include a proxy module 13, a local access module 14 and an electronic safe 15. Thus, since this first set 10' includes a local access module 14 and an electronic safe 15, it will be able, in case of a functional connection, to authenticate directly to a core network. In addition, it includes a proxy module 13 which can be configured to manage the addressing of authentication requests to the second functional set 10" which, since it includes a subscription database 11 and a security management entity emulator 12, can be configured to perform authentication of the remote mobile communication terminals 20 and perform local authentication. The connection between the two functional sets 10', 10" can be a local, wired or radio connection.

Figure 3:
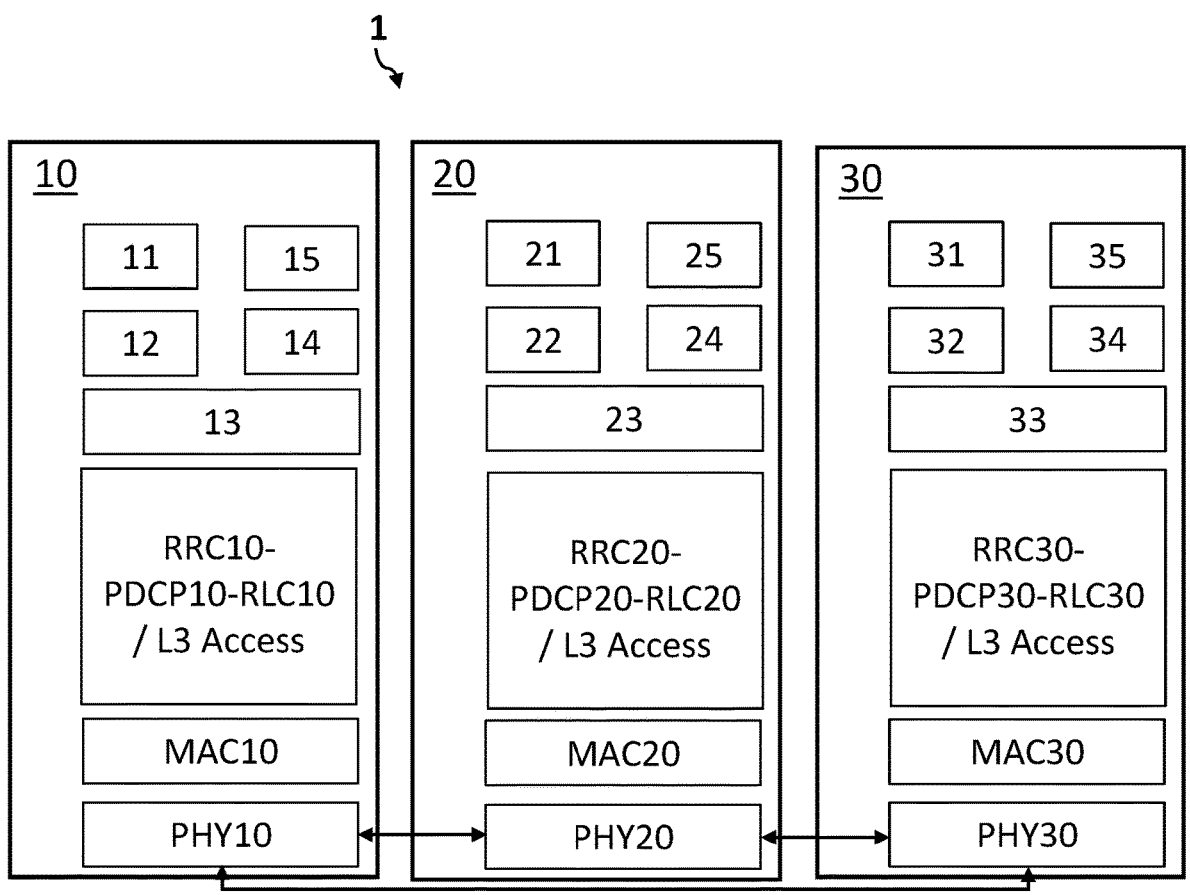
FIG. 3 is a diagram illustrating an embodiment of a communication system for which each of the mobile communication terminals comprises a subscription database.

To allow mobile communication terminals to manage autonomously, that is independently of fixed equipment in the core network, their mutual authentication, via a direct mode link to establish a data transport link, each local mobile communication terminal 10 and remote mobile communication terminal 20 can integrate several specific entities. At the local level of each mobile communication terminal, the role of these entities is to allow a remote link entity (that is belonging to another mobile communication terminal, or more generally to a remote mobile communication terminal) to authenticate to the subscription database of the local mobile communication terminal. With reference to FIG. 3, in one embodiment, a radio communication system according to the invention may include mobile communication terminals 10, 20, 30, each equipped with a subscription database 11, 21, 31, a security management entity emulator 12, 22, 32, and a proxy module 13, 23, 33. Within this system, the mobile communication terminals according to the invention are connected via a direct mode link, preferably complying with a D2D standard communication protocol adapted to the establishment of such a link.

In addition, the mobile communication terminals 10, 20, 30 can each be equipped with a local access module 14, 24, 34, and an electronic safe 15, 25, 35. Thus, the mobile communication terminals can be configured as standard mobile terminals. Indeed, in one embodiment, the mobile communication terminals are configured to be able to establish, under cover or anonymously, a connection to the core network and thus ensure the authentication of the terminal, and allow it to obtain derived keys. In this case, the invention is of particular interest when such authentication is not possible (that is loss of access to the fixed equipment of a network core normally performing this function). The direct mode link provides authentication between the different mobile communication terminals 10 and 20 notwithstanding their remoteness from the range, or the failure or destruction, of fixed equipment in a core network normally performing this function.

Figure 4:
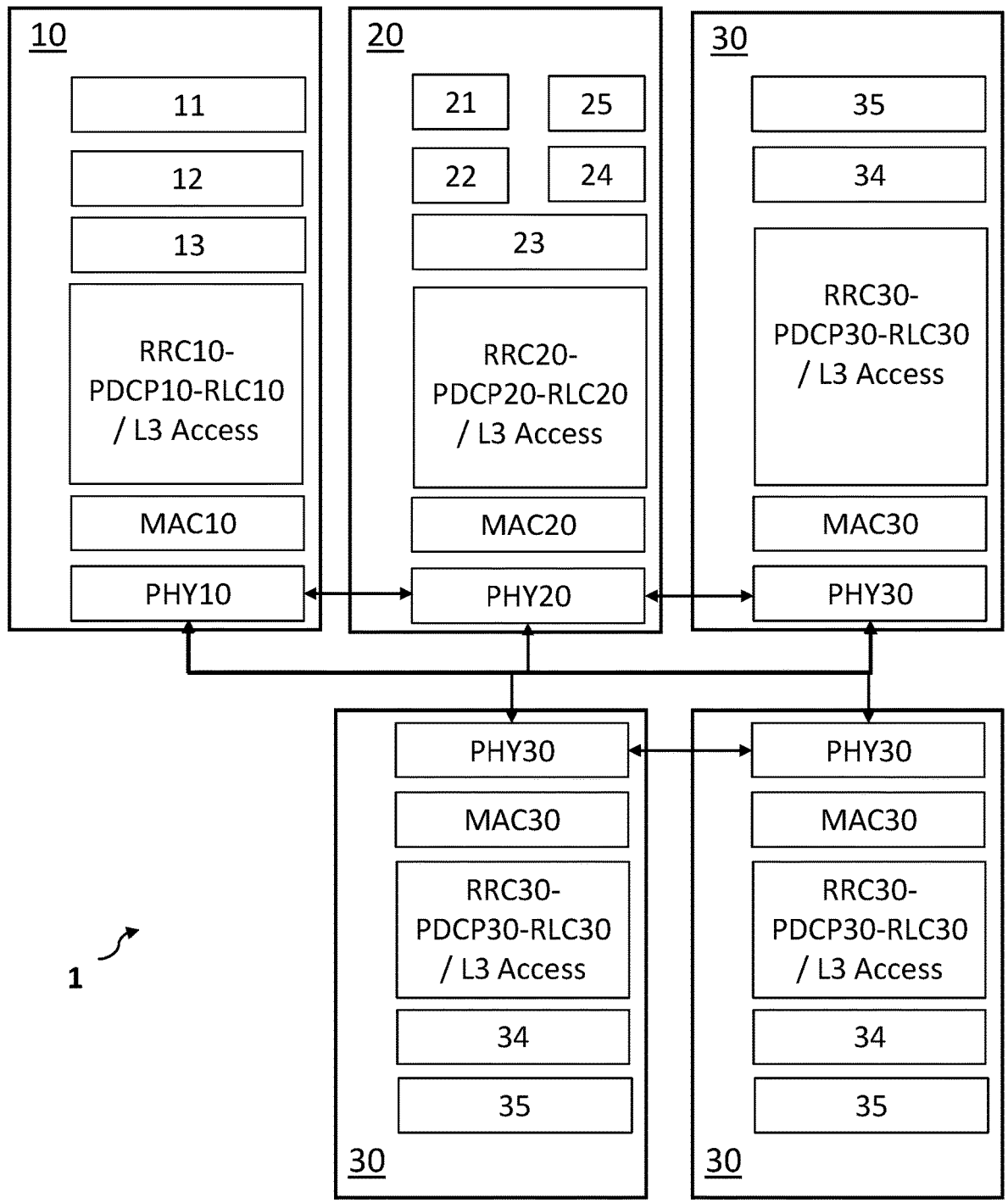
FIG. 4 is a diagram illustrating an embodiment of a communication system for which part of the mobile communication terminals comprises a subscription database.

With reference to FIG. 4, the communication system 1 according to the invention may include:
- at least one mobile communication terminal 10, including a subscription database 11, a security management entity emulator 12, and a proxy module 13 but not including an electronic safe 15;
- at least one mobile communication terminal 20, including a subscription database 21, a security management entity emulator 22, a proxy module 23, a local access module 24 and an electronic safe 25;
- several mobile communication terminals 30, including a local access module 34 and an electronic safe 35 but not including a subscription database, a security management entity emulator nor a proxy module.

Indeed, to implement the invention, it is essential that at least one of the mobile communication terminals includes a subscription database 21, a security management entity emulator 22, a proxy module 23.

Figure 5:
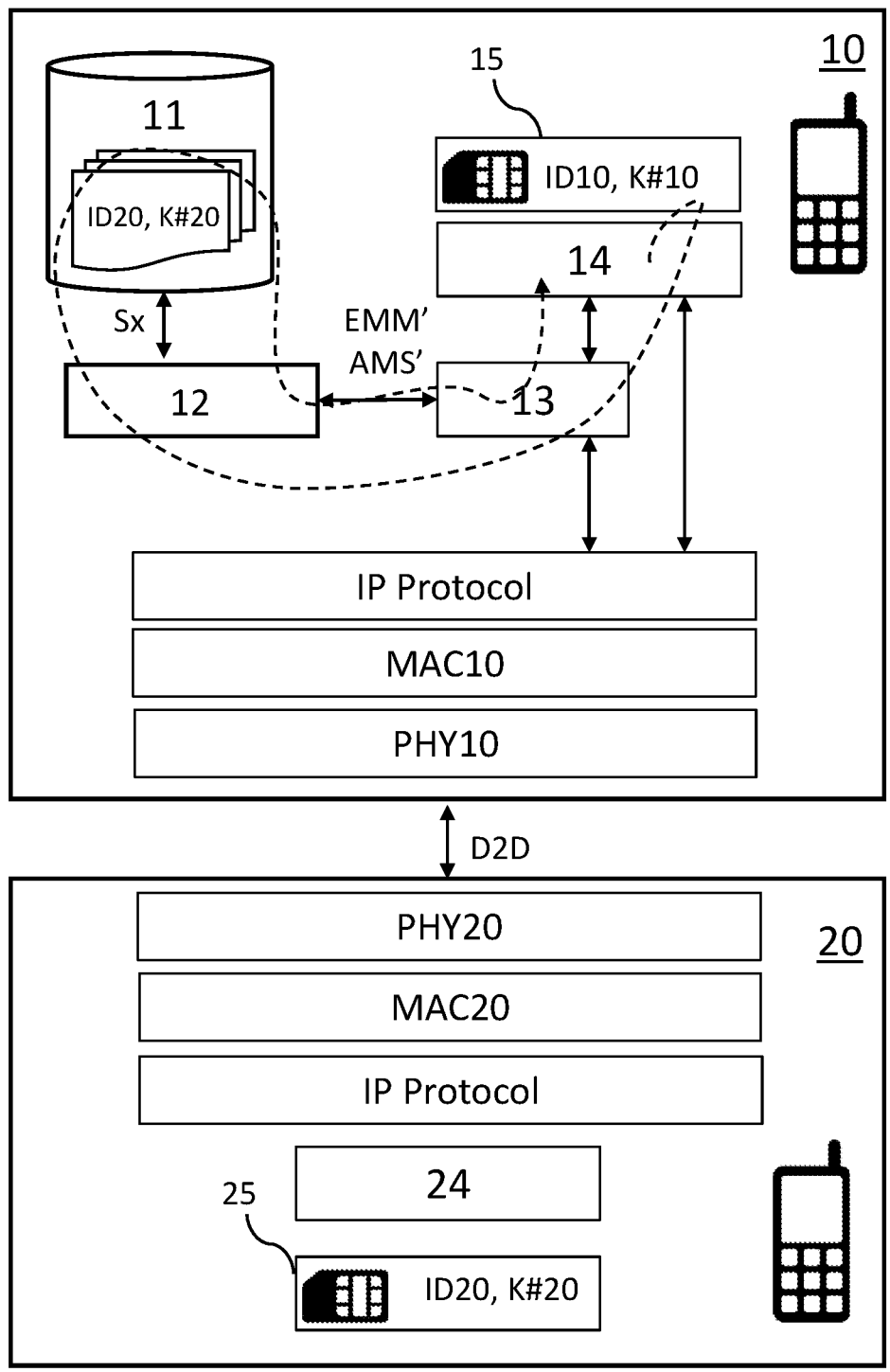
FIG. 5 is a block diagram of a communication system comprising two mobile communication terminals and further illustrating the management of the local authentication of a mobile communication terminal to its subscription database.
Figure 6:
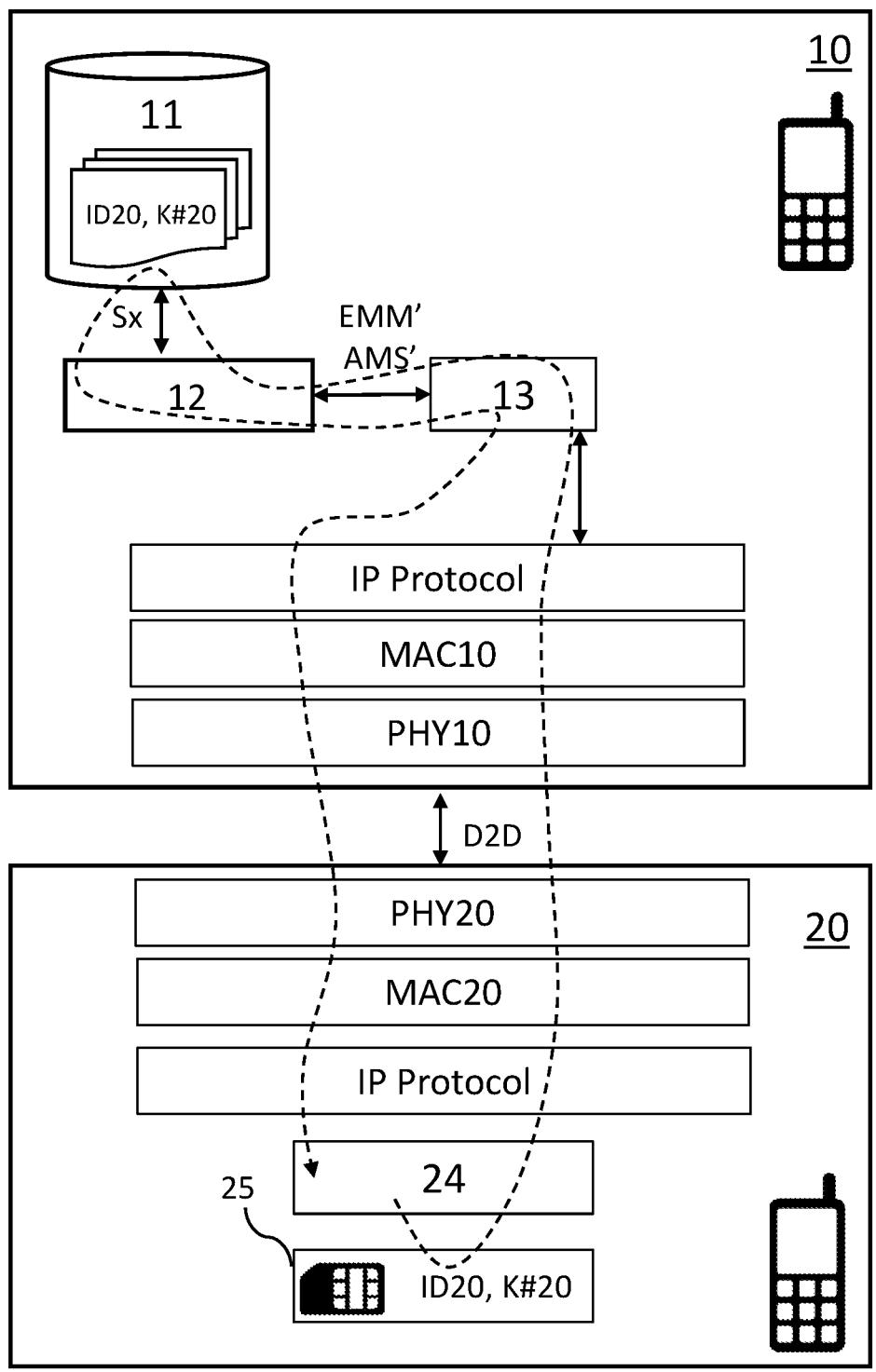
FIG. 6 is a block diagram of a communication system comprising two mobile communication terminals and further illustrating the management of the remote authentication of a remote mobile communication terminal to the subscription database of the local mobile communication terminal.
Figure 7:
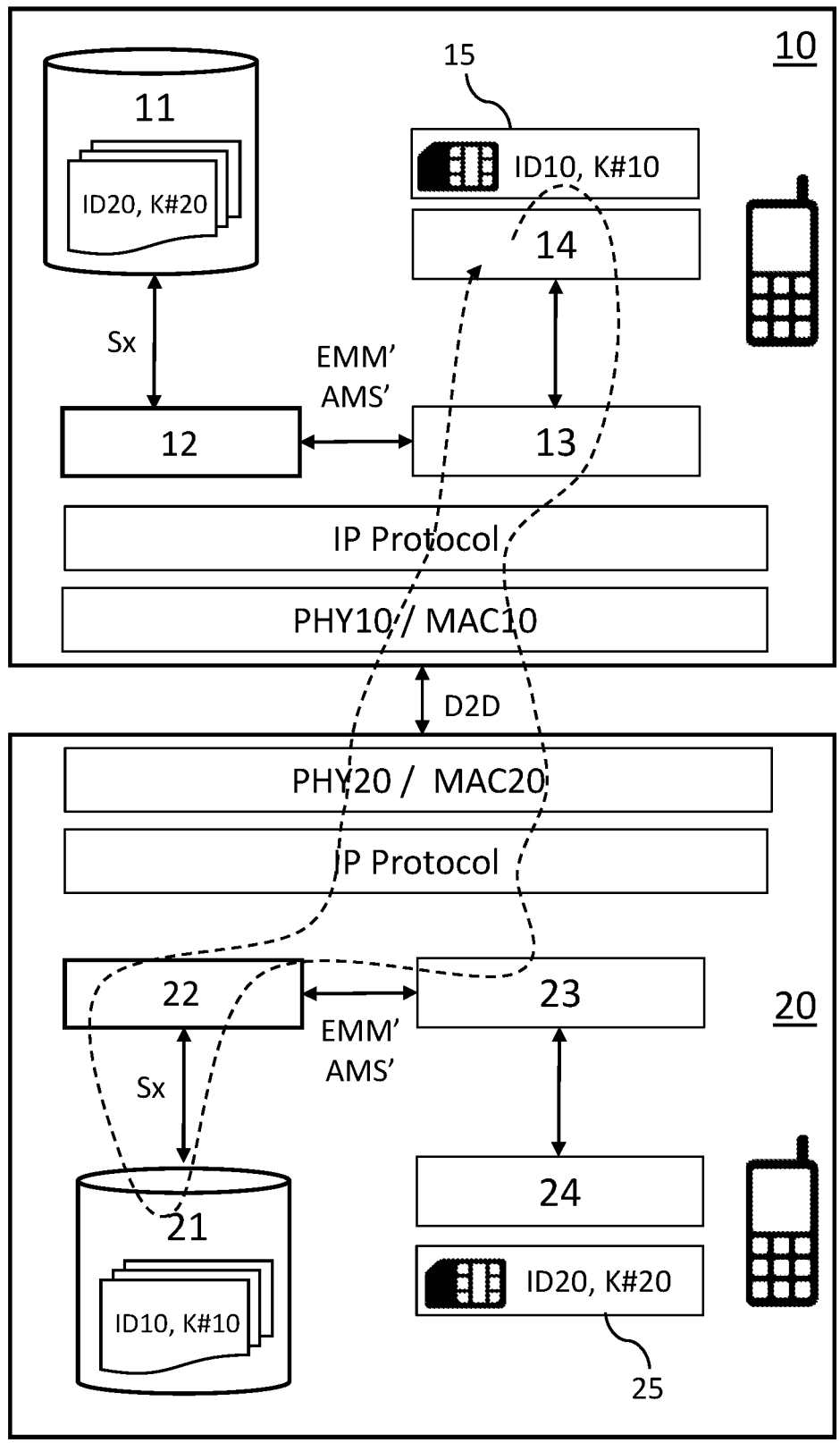
FIG. 7 is a block diagram of a communication system comprising two mobile communication terminals and further illustrating the management of the remote authentication of the local mobile communication terminal to the subscription database of a remote mobile communication terminal.

With reference to FIGS. 5, 6 and 7, several embodiments of a mobile radio system with mobile communication terminals 10, 20, each equipped or not with a subscription database 11, 21, will now be described. In these embodiments, the communication terminals 10 and/or 20 also support an "IP protocol" protocol layer for IP protocol, located at level 3 in the OSI model, and allowing a single addressing service for all of said communication terminals. Particular reference will be made to the authentication process for mobile terminals depending on the situation.

In particular, FIG. 5 describes a useful local authentication, for example, where only a local mobile communication terminal 10 is equipped with a subscription database 11, a security management entity emulator 12, and a proxy module 13. In this case, as illustrated by the dotted arrow, the local access module 14 accesses the electronic safe 15 and, by interfacing with the USIM for example, issues an attachment request type request. This attachment request is transmitted by the proxy module 13 to the security management entity emulator 12 according to an appropriate exchange protocol such as an exchange protocol of the mobility management protocol type EMM' ("EPS Mobility Management" in Anglo-Saxon terminology) or AMS' ("Access system Modem baseband Subsystem" in Anglo-Saxon terminology).

The security management entity emulator 12 can launch an authentication procedure, on a Sx-like format, by requesting authentication vectors from the subscription database 11 and then will transmit the authentication request to the local access module 14 using the proxy module 13. The local access module 14 will then be able to transmit an authentication response message. Although not shown, several message exchanges may be supported by the mobile radio system and in particular the local mobile communication terminal 10 to finalize local authentication.

FIG. 6 describes a mutual authentication initiated by a remote mobile communication terminal 20 to a local mobile communication terminal 10. As illustrated, in this case, the remote mobile communication terminal 20 may not include a subscription database, a security management entity emulator, nor a proxy module. As for the local mobile communication terminal 10, it is equipped with a subscription database 11, a security management entity emulator 12, and a proxy module 13.

In this case, as illustrated by the dotted arrow, the local access module 24 accesses the electronic safe 25 and, by interfacing with the USIM for example, issues an attachment request type request. This attachment request is transmitted to the proxy module 13 of the local mobile communication terminal 10. In particular, this attachment request is transmitted according to a direct mode communication protocol. The proxy module 13 transmits the request to the safety management entity emulator 12 according to an appropriate exchange protocol, for example EMM' or AMS'. The security management entity emulator 12 can launch an authentication procedure, on a Sx-like format, by requesting authentication vectors from the subscription database 11 and then will transmit the authentication request to the proxy module 13. The proxy module 13 then transmits authentication data, for example in the form of an authentication request, to the local access module 24 of the remote mobile communication terminal 20. An authentication request will include authentication elements that allow the recipient to prove its legitimacy. These authentication elements could advantageously include random data as well as a signaling portion of a protocol conforming to the direct mode link. As will be described later, the local access module 24 will be able to interface with the electronic safe 25 to calculate a result, check the authentication seal of the local mobile communication terminal 10, and possibly calculate a key. The access module 24 will then be able to transmit an authentication response message. Although not shown, several message exchanges may be supported by the mobile radio system between the local mobile communication terminal 10 and the remote mobile communication terminal 20 to finalize the mutual authentication of these two mobile communication terminals.

The one skilled in the art will appreciate that the subscription database 11 and the security management entity emulator 12 of the mobile communication terminal 10 are not integrated into a core network. Thus, the present invention allows secure mutual authentication of mobile communication terminals in the absence of access to a core network.

Thus, a communication system 1 according to the invention allows mutual authentication between a local mobile communication terminal 10 and a remote mobile communication terminal 20 for the establishment a direct mode link. Advantageously, many remote mobile communication terminals 20 can all authenticate to the same terminal having the subscription database 11 and then communicate with each other.

FIG. 7 describes a mutual authentication initiated by a local mobile communication terminal 10 to a remote mobile communication terminal 20. As illustrated, in this case, the remote mobile communication terminal 20 may include a subscription database 21, a security management entity emulator 22, a proxy module 23, a local access module 24 and an electronic safe 25. The local mobile communication terminal 10 is also equipped with these bricks.

In this case, as illustrated by the dotted arrow, the local access module 14 accesses the electronic safe 15 and, by interfacing with the USIM for example, issues an attachment request type request. This attachment request is transmitted directly to the proxy module 23 of the remote mobile communication terminal 20 or via the proxy module 13 of the local mobile communication terminal 10.

Advantageously, the local mobile communication terminal 10 is configured so that the attachment request is routed through the proxy module 13. Indeed, the proxy module 13 can then be configured to select remote or local authentication according to the number of mobile communication terminals present (local mode to limit radio load) or alternatively for greater operational security (remote mode).

In particular, this attachment request is transmitted according to a direct mode communication protocol to the remote mobile communication terminal 20. The proxy module 23 may transmit the request to the security management entity emulator 22 of the remote mobile communication terminal 20 according to a suitable exchange protocol, for example EMM' or AMS'. The security management entity emulator 22 of the remote mobile communication terminal 20 can launch an authentication procedure, on an Sx-like format, by requesting authentication vectors from the subscription database 21 of the remote mobile communication terminal 20, and then will transmit an authentication request to the proxy module 23 of the remote mobile communication terminal 20. The proxy module 23 then transmits the authentication request to the local access module 14 of the local mobile communication terminal 10. As will be described later, the local access module 14 will be able to interface with the electronic safe 15 to calculate a result, check the authentication seal of the remote mobile communication terminal 20, and possibly calculate a key, such as a $K_{ASME}$ key. The access module 14 of the local mobile communication terminal 10 will then be able to transmit an authentication response message. Although not shown, several message exchanges may be supported by the mobile radio communication system between the local mobile communication terminal 10 and the remote mobile communication terminal 20 to finalize mutual authentication of these two mobile communication terminals.

Finally, the security management entity emulator 12 of a local mobile communication terminal 10 and the associated proxy module 13 are adapted to allow a remote mobile communication terminal 20 to perform an authentication request to the subscription database 11 of said local mobile communication terminal 10 or vice versa. Thus, in the example shown in FIG. 7, when establishing a direct mode link between the mobile communication terminals 10 and 20, the proxy modules 13 and 23 and the security management entity emulators 12 and 22 allow the two mobile communication terminals 10, 20, respectively, to mutually authenticate, that is to perform shared secret exchanges, only by exchanging indirectly with the subscription database 11, 21, respectively, of the other mobile communication terminal 10, 20. To this end, the database 21 of the remote mobile communication terminal 20 stores the unique identifier ID10 of the local mobile communication terminal 10.

Preferably, the interface noted Sx in FIGS. 5, 6 and 7, may be a proprietary S6a'-like interface for either:

- exchanging security procedures, based on local reading and local access for local authentication to the subscription database of the local mobile communication terminal; or
- allowing remote mobile communication terminals to authenticate to the local subscription database 11 via the security management entity emulator 12. In this case, the proxy module relays the D2D interface(s) to the remote mobile communication terminal(s).

According to another aspect, the invention relates to an authentication method, preferably mutual, between a local mobile communication terminal 10 and a remote mobile communication terminal 20 for the establishment of a direct mode link between said communication terminals. Such a method can preferably be implemented by a local mobile communication terminal 10 according to the invention and in particular in a communication system 1 according to the invention.

Briefly, an authentication method according to the invention may include three main steps:

- sending an attachment message, by the remote mobile communication terminal 20, said attachment message preferably including the unique identifier ID20 of said remote mobile communication terminal; In particular, in 5G 3GPP, the unique identifier (IMSI or equivalent) can itself be transmitted encrypted (SUCI, "Subscription Concealed Identifier" in Anglo-Saxon terminology);
- sending, by the local mobile communication terminal 10, an authentication request generated from an authentication vector VA, said authentication vector VA from at least one security key being generated by a subscription database 11 of said local mobile communication terminal; preferably the authentication request includes a random element constituting an authentication element;
- authentication, by the mobile communication terminal 20, of the local mobile communication terminal 10;
- sending an authentication response, by the remote mobile communication terminal 20, said authentication response including a signaling portion of a protocol conforming to the direct mode link for the authentication of said remote mobile communication terminal 20 to the subscription database 11 of said local mobile communication terminal 10.

Figure 8:
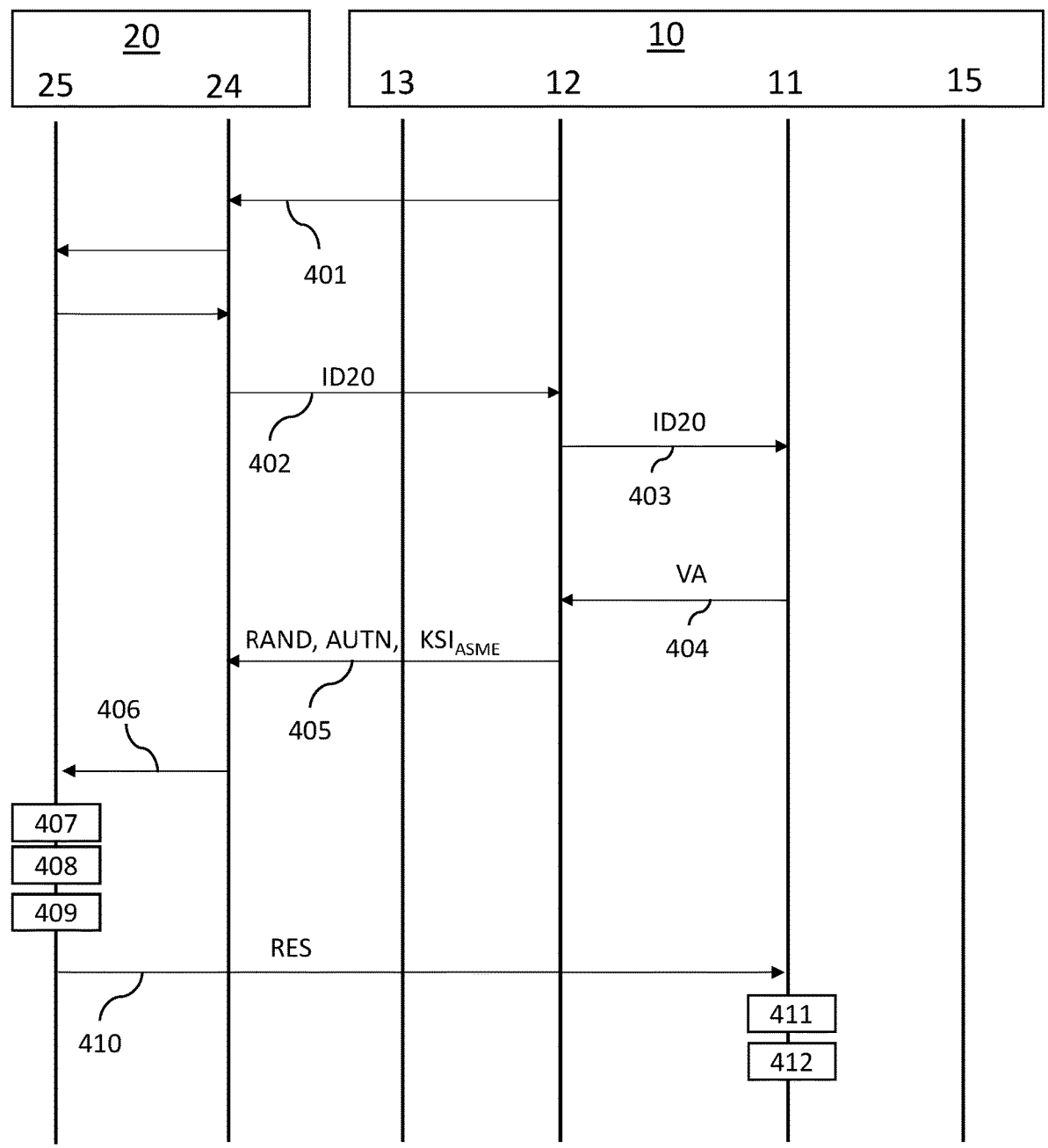
FIG. 8 is a diagram illustrating a method for exchanging shared secrets between mobile communication terminals of the system in FIG. 1, for the mutual authentication of said mobile communication terminals when establishing the direct mode link.

With reference to FIG. 8, the exchanges of shared secrets between the mobile communication terminals of the system shown in FIG. 1 will now be described.

The different steps described below are carried out in particular between two mobile communication terminals 10, 20. More specifically, FIG. 8 shows the procedure for mutual authentication of the two mobile communication terminals 10, 20 having access to the subscription database 11 of a local mobile communication terminal 10 according to the invention. The remote mobile communication terminal 20 may receive one or more authentication requests 401 from the local mobile communication terminal 10 and in particular from the security management entity emulator 12. The remote mobile communication terminal 20 can respond by sending 402 its unique identifier ID20 such as its IMSI and/or IMEI depending on the request. Moreover, in 5G, the SUCI, the equivalent of the IMSI, can be sent in encrypted form to avoid being read in clear text on preliminary exchanges that are not encrypted (because prior to the authentication procedure itself). The result at the time of authentication will be of the same type except that it will be based on an encrypted SUCI and not a clear IMSI.

Alternatively, the remote mobile communication terminal 20 can initiate a first RRC type connection with the local mobile communication terminal 10. Thus, the authentication procedure can be issued from the remote mobile communication terminal 20 first or from the local mobile communication terminal 10 first. Preferably, the local mobile communication terminal 10 will initiate an authentication procedure after receiving a message from the mobile communication terminal 20 including, for example, its unique identification number.

In addition, the communication system according to the invention can be configured so that all local or remote mobile communication terminals have stored a same security key. This may be the case in particular when only one group of terminals is managed by the communication system according to the invention. Indeed, if only one group of terminals is used, then all the terminals will have a same security key and will therefore derive a same key. In general, a unique key to identify terminals is avoided for reasons of contamination. On the other hand, the storage of a common key in the context of the present invention is useful for a service shared by all terminals (already individually identified). In general, it is a different key from the one associated with the unique identifier (for example IMSI, SUCI) and it may correspond to a group call type service. In addition, sending the identifier of the remote mobile communication terminal may not be essential.

Upon receipt of the IMSI from the remote mobile communication terminal 20, the security management entity emulator 12 of the local mobile communication terminal 10 requests 403 authentication vectors VA from its subscription database 11 (for example "Home Subscriber Server" in Anglo-Saxon terminology). The subscription database 11 will be able to return one or more authentication vectors VA, each of which will include security parameters, or authentication elements, which will be a function of a security key K #20 stored in the subscription database 11 and associated with the identifier of the remote mobile communication terminal 20. The subscription database 11 will be able to return one or more authentication vectors VA, each of which will include security parameters, or authentication elements, RAND, AUTNHSS, and XRES that will be a function of a security key K #20 stored in the subscription database 11 and associated with the identifier of the remote mobile communication terminal 20. The subscription database 11 will also be able to return one or more authentication vectors VA, each of which will include a $K_{ASME}$ type security parameter that will be a function of a security key K #20 stored in the subscription database 11 and associated with the identifier of the remote mobile communication terminal 20.

These security settings or authentication elements include:
RAND: a random number;
AUTNHSS: an authentication token that can be used by the remote mobile communication terminal 20 and in particular the digital safe 25 to authenticate the local mobile communication terminal 10; and/or XRES: the result of the authentication of the remote mobile communication terminal 20 according to a security key known by the HSS (which is also registered in the UICC for "universal integrated circuit card" according to Anglo-Saxon terminology). XRES is the result calculated at the network level from the RAND and the parameters known to the EU (for "user equipment" according to Anglo-Saxon terminology) and can also be a suitable authentication element.

These security parameters or authentication elements may include $K_{ASME}$: a derivation key calculated, in particular, from an encryption key (CK) and an integrity key (IK).

It is important for the authentication elements transmitted to be different each time the subscription database 11 is switched on and in particular each time authentication is requested for obvious security reasons. To this end, varying the RAND/AUTNHSS parameters of the authentication vector VA each time when switching on ensures this key changes.

Milenage algorithms can be used but they can be replaced by other algorithms (the architecture is independent of these algorithms, it is just important that the subscription database 11 and the electronic safes 15 use the same algorithms).

The security management entity emulator 12 selects one of the authentication vectors VA received 404 from the subscription database 11. In addition, it calculates a $KSI_{ASME}$ ("Key Set Identifier Access Security Management Entity" in Anglo-Saxon terminology) parameter which corresponds to the index of the $K_{ASME}$ key.

The safety management entity emulator 12 transmits 405 to the remote mobile communication terminal 20 the RAND, AUTNHSS and $KSI_{ASME}$ information associated with the selected vector. This corresponds to the only necessary elements allowing the remote mobile communication terminal 20 to authenticate the local mobile communication terminal 10 (AUTNHSS), the random variable RAND allowing the remote mobile communication terminal 20 to calculate its authentication token XRES and the $KSI_{ASME}$ allowing the remote mobile communication terminal 20 to calculate the encryption and integrity keys.

This information is transmitted 406 by the local access module 24 to the digital safe 25 which, upon receipt of RAND and AUTNHSS and $KSI_{ASME}$:
  calculates 407 RES, $AUTN_{dist}$ information, for example by means of the Milenage algorithms contained in a SIM card;
  checks 408 that the received AUTN value is identical to the calculated $AUTN_{dist}$ value, which ensures that the local mobile communication terminal 10 is authenticated; If the two values are identical, the remote mobile communication terminal 20 authenticates the local mobile communication terminal 10 and saves the parameter $KSI_{ASME}$ as an index to calculate $K_{ASME}$;
  uses 409 the value of the $KSI_{ASME}$ parameter to calculate the $KSI_{ASME}$ key which can be used as a "parent" key to derive other encryption keys such as CK and CI;
  returns 410 the RES value to the local mobile communication terminal 10.

Upon receiving RES, the local mobile communication terminal 10 compares 411 the received value with an XRES value of the initial authentication vector.

If these values are identical, the local mobile communication terminal 10 considers the remote mobile communication terminal 20 as authenticated and then uses 412 the $K_{ASME}$ key contained in the initial vector as the derivation key.

Thus, the mutual authentication procedure allows, through a final exchange, the local mobile communication terminal 10 to be assured that the remote mobile communication terminal 20 is properly authenticated, while the remote mobile communication terminal 20 knows, from the initial request, that the local mobile communication terminal 10 is valid (step 408).

Complementarily, examples of operating procedures can be as follows:
- one local mobile communication terminal 10 per group has the subscription database 11, the others do not.
- all remote mobile communication terminals 20, 30 authenticate to this local mobile communication terminal 10 (which advantageously has a specific radio channel so as not to use the radio resources of terminals that are already communicating).
- At the place of communication, the local mobile communication terminal 10 with the subscription database 11 remains present, allowing new mobile communication terminals to join a group by authenticating.

Alternatively, a single local mobile communication terminal 10 has the subscription database 11 and, regardless of the group to which a remote mobile communication terminal 20 belongs, it authenticates to this local mobile communication terminal 10 which is not present at the place of operation, but only at the start of the operation when the remote mobile communication terminals 20 are switched on.

These mechanisms do not exclude the possibility that two remote mobile communication terminals 20 from a same group may communicate independently on another channel with a specific encryption key. For example, it is sufficient for mobile communication terminals to be configured to be able to derive a key from the group encryption key (itself derived from the native key) taking the channel number as a parameter.

It should be noted that in the exchanges, the $K_{ASME}$ key never transited the radio link. The identical values AUTN received/AUTN calculated, on the remote mobile communication terminal 20 side, and RES/XRES on the local mobile communication terminal 10 side, ensure that the $K_{ASME}$ key is identical between the two radio mobile communication terminals communicating with each other.

The remote mobile communication terminal 20 derives the $K_{ASME}$ key from CK, IK, $KSI_{ASME}$ (received from the security management entity emulator 12). The $KSI_{ASME}$ sent by the security management entity emulator 12 may subsequently allow the remote mobile communication terminal 20 and the security management entity emulator 12 to identify the native $K_{ASME}$ key without having to carry out one more time an authentication procedure on new connections.

Similarly, the CK and IK keys are never transmitted from the subscription database 11 to the security management entity emulator 12, but always remain internal.

To identify the local mobile communication terminal 10 or more specifically the subscription database 11, there are multiple methods. Some examples of possible implementation include:
- the remote mobile communication terminal 20 is configured with one or more IP addresses of mobile communication terminals that can host a subscription database 11. This database is further identified by a specific port number;
- alternatively, the subscription database 11 has its own IP address, the requests are transmitted by routing to the terminal hosting the subscription database 11;
- alternatively, the remote mobile communication terminal 20 makes a request in a broadcast mode. One or more terminals hosting the subscription database can then respond; and
- alternatively, without using an IP address, but as in 3GPP standards, the message header indicates the service (RR, MM, CC, GMM, RRC . . . ).

Figure 9:
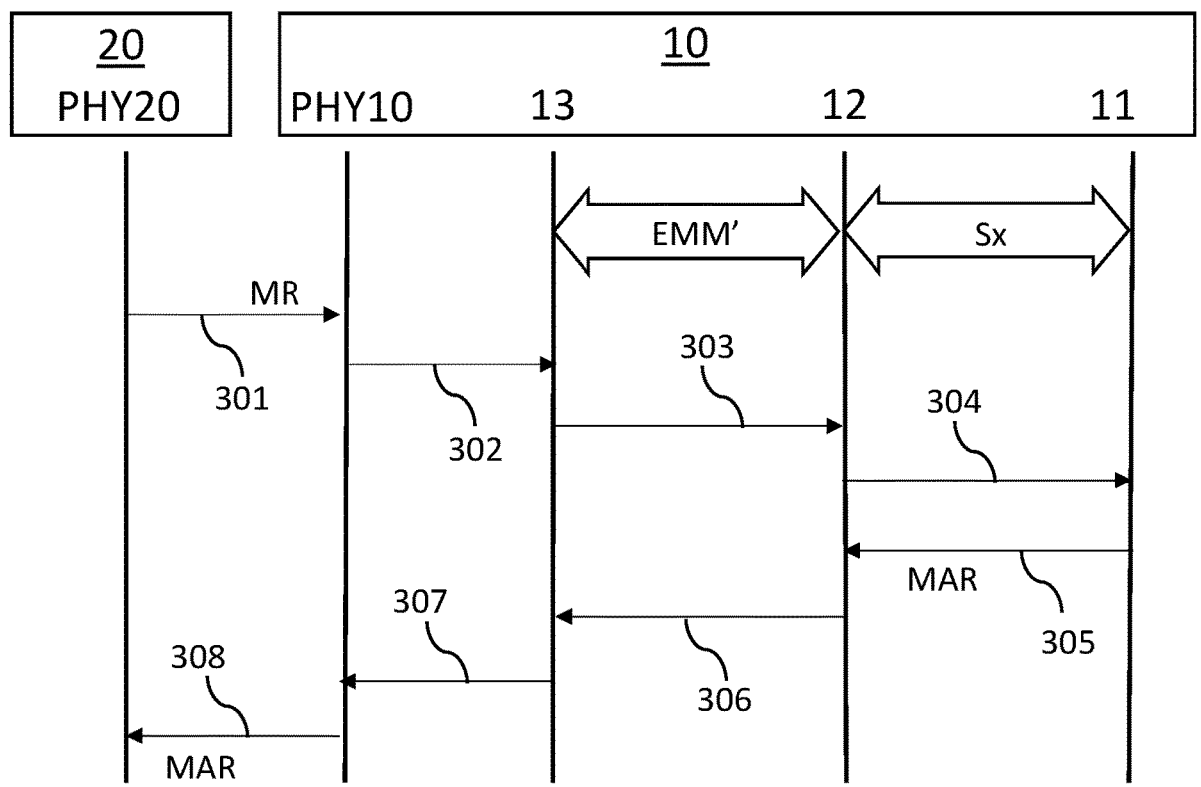
FIG. 9 is a diagram illustrating a method for exchanging shared secrets between mobile communication terminals of the system in FIG. 1, for the authentication of said mobile communication terminals when establishing the direct mode link according to another embodiment.

As illustrated in FIG. 9, in another embodiment, an authentication method according to the invention may include in particular a step of transmitting 301, to a local mobile communication terminal 10, an MR authentication request to the subscription database 11 of said local mobile communication terminal 10, said MR authentication request being from a remote mobile communication terminal 20 and passing through the proxy module 13 of the local mobile communication terminal 10.

In particular, this MR authentication request can be transmitted, in a step 302, to a proxy module 13 of the local communication terminal 10.

In step 303, the proxy module 13, in turn, transmits the MR authentication request to a security management entity emulator 12 of the local mobile communication terminal 10. As already mentioned above with reference to FIG. 2, this EMM' transmission can, in a non-limiting example, use a proprietary interface based on the EMM protocol of the LTE standards of the 3GPP consortium.

In step 304, the security management entity emulator 12 of the local mobile communication terminal 10 presents the MR authentication request to a subscription database 11 of the local mobile communication terminal 10. This Sx transmission is carried out, for example, via a standard access interface of the S6a or S6d type or a proprietary interface, as explained above with reference to FIG. 2. In particular, this presentation is configured in such a way as to allow the authentication of the remote mobile communication terminal 20 to the subscription database 11 of the local mobile communication terminal 10.

Preferably, in a step 305, the subscription database 11 of the local mobile communication terminal 10 transmits back authentication information of said local mobile communication terminal 10, in the form of an integrity check message MAR, and transmits this authentication information, via the access interface, to the security management entity emulator 12 of the local mobile communication terminal 10.

In step 306, the security management entity emulator 12 transmits the authentication information to the proxy module 13 of the local mobile communication terminal 10.

In step 307, the proxy module 13 of the local mobile communication terminal 10 transmits the authentication information to the local mobile communication terminal 10 of the mobile structure.

Finally, in step 308, the local mobile communication terminal 10 transmits, via the direct mode link, said authentication information, in the form of an integrity check message MAR, to the remote mobile communication terminal 20.

Advantageously, but not restrictively, an integrity check message is emitted by the local mobile communication terminal 10, following the reception of an authentication request MR to the mobile communication terminal having emitted said authentication request. Such an integrity check message then encodes data relating to the success or failure of the authentication of the remote mobile communication terminal 20 to the local mobile communication terminal 10. Data communication between the remote mobile communication terminal 20 and the local mobile communication terminal 10 may advantageously be subject to receipt of said integrity check message by the remote mobile communication terminal 20.

The present invention has been described and illustrated in the present detailed description and in the figures of the accompanying drawings, in possible embodiments. The present invention is not limited, however, to the embodiments shown. Other variants and embodiments may be deduced and implemented by the person skilled in the art upon reading the present description and the accompanying drawings.

In all of the cases described above, the mobile communication terminals 10, 20 are connected to each other by direct mode links and can thus form a data transport network. The network can have a mesh structure. Advantageously, such a network can be a substitute for a fixed network when it is out of radio range, destroyed or inoperative. In addition, each mobile communication terminal can also be configured so that direct mode links established with one or more remote mobile communication terminals use a point-to-multipoint protocol.

The invention claimed is:

1. A communication system comprising a local mobile communication terminal and one or more remote mobile communication terminals, said one or more remote mobile communication terminals including an electronic safe configured to store at least one security key, said local mobile communication terminal being configured to establish a direct mode link with said one or more remote mobile communication terminals, said local mobile communication terminal comprising:
    a subscription database configured to store at least one security key, each of the security keys forming a secret shared between the local mobile communication terminal and said one or more remote mobile communication terminals and to generate at least one authentication vector from the at least one security key;
    a security management entity emulator configured to emulate an access interface to the subscription database of said local mobile communication terminal and to generate an authentication request from the at least one authentication vector; and,
    a proxy module configured to relay the authentication request between the security management entity emulator and the one or more remote mobile communication terminals, said authentication request including a signaling portion of a protocol conforming to the direct mode link for authentication of said one or more remote mobile communication terminals to the subscription database of said local mobile communication terminal;
    wherein the security management entity emulator of the local mobile communication terminal is adapted to allow the one or more remote mobile communication terminals to perform the authentication request without passing through a radio interface of a base station.

2. The communication system according to claim 1, wherein the authentication request comprises random data as well as a signaling portion of a protocol conforming to the direct mode link.

3. The communication system according to claim 1, wherein the proxy module is further configured to receive an authentication response from the one or more remote mobile communication terminals, said authentication response including a signaling portion of a protocol conforming to the direct mode link and an authentication result.

4. The communication system according to claim 2, wherein the security management entity emulator is further configured to check a correspondence between an authentication result transmitted by the one or more remote mobile communication terminals and an authentication token generated by the subscription database.

5. The communication system according to claim 1, wherein the local mobile communication terminal and/or the one or more remote mobile communication terminals include an electronic safe adapted to store a unique identifier associated with said local mobile communication terminal and the remote mobile communication terminal, respectively.

6. The communication system according to claim 1, wherein the proxy module is configured to carry an integrity check message when establishing the communication between the local mobile communication terminal and the one or more remote mobile communication terminals.

7. The communication system according to claim 1, wherein the local mobile communication terminal is configured to establish said direct mode link with a plurality of the one or more remote mobile communication terminals according to a point-to-point or multipoint protocol.

8. The communication system according to claim 7, wherein the local mobile communication terminal is configured to allow a plurality of said one or more remote mobile communication terminals to authenticate with the local mobile communication terminal having the subscription database and then communicate with each other.

9. The communication system according to claim 1, wherein the local mobile communications terminal and the one or more remote mobile communication terminals are configured to be able to use a mobile communication network selected from LTE, 5G, Wimax, 3G, Wifi and Bluetooth networks.

10. The communication system according to claim 1, wherein the security management entity emulator is adapted to support an access interface to the subscription database based on a S6a-like interface of the LTE standards of the 3GPP consortium.

11. The communication system according to claim 1, wherein the proxy module is adapted to support an access interface to the security management entity emulator based on an EMM protocol of the LTE standards of the 3GPP consortium.

12. The communication system according to claim 1, wherein the local mobile communication terminal is configured to use a specific radio channel for the authentication of said one or more remote mobile communication terminals.

13. A mobile communication terminal comprising:
    a subscription database configured to store at least one security key, each of the security keys forming a secret shared between a local mobile communication terminal and one or more remote mobile communication terminals and to generate at least one authentication vector from the at least one security key;
    a security management entity emulator configured to emulate an access interface to the subscription database of said local mobile communication terminal and to generate an authentication request from the at least one authentication vector, and
    a proxy module configured to relay the authentication request between the security management entity emulator and the remote mobile communication terminal, said authentication request including a signaling portion of a protocol conforming to a direct mode link for authentication of said remote mobile communication terminal to the subscription database of said local mobile communication terminal;

wherein the security management entity emulator of the local mobile communication terminal is adapted to allow the one or more remote mobile communication terminals to perform the authentication request without passing through a radio interface of a base station.

\* \* \* \* \*